United States Patent Office 2,924,528
Patented Feb. 9, 1960

2,924,528

SYNTHETIC HARD BUTTER

George Barsky, New York, N.Y., and Vigen K. Babayan, Livingston, and Guy Knafo, Boonton, N.J., assignors to E. F. Drew & Co., Inc., New York, N.Y., a corporation of Delaware No Drawing. Application August 22, 1955
Serial No. 529,959

8 Claims. (Cl. 99—118)

The present invention is directed to edible compositions, more particularly to synthetic fats which are adapted for use in hard butter compositions.

It has been customary to utilize coconut oil which has been pressed or otherwise processed as hard butters because the oil is bland, has a pleasant taste and odor and is readily digestible. Therefore, it has gone into large scale use in the making of such products as chocolate coatings and icings. However it is not completely compatible with chocolate liquors or with coco butter. As a result, the amount of such coconut oil products which can be incorporated in such compositions is more limited than is desirable. Hard butter has also been made by heating coconut oil together with higher fatty acids to displace the lower fatty acids. Such a process resulted in a by-product which had to be utilized, and the process required special equipment and close supervision. It has also been proposed to utilize fully hydrogenated oils, such as cottonseed or soya bean oils, but the melting points thereof were too high. If such oils are only partially hydrogenated, they contain liquid constituents which bleed out of the compositions.

The present invention is intended and adapted to overcome the disadvantages inherent in the prior art, it being among the objects of the present invention to provide a synthetic oil or fat which is edible, is compatible with various edible compositions and has a bland to neutral flavor.

It is also among the objects of the present invention to provide a synthetic ester product, the composition of which includes principally saturated water-insoluble acids and which product melts at approximately body temperature.

It is further among the objects of the present invention to provide mixtures of the aforesaid synthetic oil or fat with various types of edible esters in order to improve the characteristics thereof for use in such edible products as hard butter, margarine, shortening and the like.

The present invention has as its basis esters of propylene glycol with higher fatty acids having 16 and 18 carbon atoms. Preferably such esters are the neutral diesters and the acids are principally palmitic and stearic. In such case, the proportion of palmitic acid is about 65% to 85% and the proportion of stearic acid is about 35% to 15%. In certain cases it is advantageous to have present a certain amount of oleic acid in the diesters and the amount thereof is usually not over 20% of the sum of the acids present. The best results are obtained by esterifying a mixture of the several acids, whereby random esters are formed. The compositions contemplated herein have a closed capillary melting point at about body temperature, namely, about 35° to 40° C.

The random esters may be mixed or blended with other esters of edible nature. Such added esters are those of monoalcohols having 2 to 16 carbon atoms, such as ethyl and cetyl alcohols, except those toxic to humans, esterified with higher fatty acids having 16 to 18 carbon atoms. Also included in such added esters are the propylene glycol, mono-esters of acids having 16 and 18 carbon atoms. Such esters also include the mono-, di- and triglycerides of said higher fatty acids. The amount of such esters which may be blended into the synthetic oil or fat ranges from 5% to 20%.

The following are specific examples of the operation of the invention. In said examples, the stearic acid used is a commercial grade and contains approximately 91% stearic, 6.5% palmitic and 3% oleic. The palmitic acid used is of commercial grade containing approximately 93% palmitic, 6% stearic and 1% oleic. The oleic acid used is essentially a mixture of a major proportion of oleic acid with a minor proportion of isooleic, linoleic and linolenic acids in the amount of about 10%.

Example 1

There is introduced into a closed reaction vessel fitted with a mechanical agitator and connected to a source of vacuum, a mixture of approximately 57% by weight of palmitic acid, 30% of stearic acid and 13% of oleic acid. The mixture is heated to melt the acids and there is added thereto a mixture of .15% powdered zinc in 14% of 1,2-propylene glycol, said proportions being based on the weight of the mixture of acids.

The temperature of the reaction vessel is gradually raised to 160° to 170° C. and a vacuum is applied, the pressure being about 85 mm. of mercury. The zinc dissolves and water begins to distill off. When the reaction has proceeded to the extent that about 75% of the theoretical amount of water has been distilled over, the temperature is raised to about 230° C., nitrogen is passed through the reaction vessel in order to carry off the excess of unreacted fatty acids and the vacuum is increased to about 15 mm. mercury pressure. When all of the water and free fatty acids have been distilled off, the reaction vessel is allowed to cool, while maintaining the vacuum.

The crude product is washed with hydroxy acetic acid in dilute solution in water for about fifteen minutes at 60° C. to remove the zinc. The aqueous layer is siphoned off and the product is washed with water several times at about 70° C. The product is then refined with sodium hydroxide solution, washed, dried, bleached, filtered and deodorized, resulting in the diesters of 1,2-propylene glycol. The closed capillary melting point of the product is 37.2° C.

Example 2

The monoesters of palmitic and stearic acids with 1,2-propylene glycol are produced separately. The procedure is analogous to that described in Example 1, the ratio of fatty acids to propylene glycol being equimolecular plus a slight excess of the glycol. When the reaction is complete, the excess of propylene glycol is washed out with a 5% brine solution or a 5% solution of sodium sulphate.

A mixture is made of 2 parts of the palmitic esters with 1 part of the stearic ester and they are blended by melting the mixture with agitation until the mass is homogeneous. The physical mixture of the two esters has a closed capillary melting point of 44° C.

Example 3

A mixture is made of 75% of palmitic acid and 25% of stearic acid, which mixture is reacted with 1,2-propylene glycol as set forth in Example 1 and the product refined, bleached and deodorized. The random esterified composition has a closed capillary melting point of 38.9° C.

The aforesaid composition is then mixed with the propylene glycol mono-palmitate in the ratio of 92% of the mixed ester to 8% of the mono-palmitate. The resulting composition has a melting point of 36.5° C.

Example 4

The random esterified mixture of palmitic and stearic acids described in Example 3 is melted with tri-palmitin. The proportions are 90% of the mixed esters to 10% of the tri-palmitin and the composition has a melting point of 37° C.

Example 5

The aforesaid random esterified product of Example 3 is mixed in the proportion of 84% thereof with 16% of ethyl stearate. The mixture has a melting point of 37.1° C.

Example 6

The random esterified esters of Example 3 are blended in the proportion of 85% with 15% of ethyl palmitate and the resulting mixture has a melting point of 37.7° C.

Example 7

The random esterified product of Example 3 is mixed with various amounts of mixed triglycerides as follows:

A. It may be mixed with about 5% of the product described in the Barsky Patent No. 2,182,332, dated December 5, 1939, the final composition having a melting point of 35.2° C.

B. The random esterified product of Example 3 is incorporated with about 5% of hydrogenated soya bean oil having a melting point of 94° F., the final composition having a melting point of 36.4° C.

C. Said random esterified product of Example 3 may be mixed with about 10% of said hydrogenated soya bean oil, the final composition having a melting point of 36.1° C.

D. Said random esterified product has incorporated therein about 20% of triolein, the final composition having a melting point of 37.0° C.

Example 8

There are provided separately the 1,2-propylene glycol diesters of palmitic and of stearic acids. They are physically blended in the proportions of 80 to 20, respectively, giving a composition having a melting point of 43° C.

Example 9

To the mixture of the 1,2-propylene glycol diester of palmitic acid and the 1,2-propylene glycol diester of stearic acid mixture of Example 2, an interesterification catalyst of 0.3% of sodium methylate is added, and the esters interesterified at 40°–50° C. for 3–4 hours. The product is refined, bleached and deodorized. It has a closed capillary melting point of 38° C.

The above examples are intended to illustrate the many variations inherent in the invention and they do not limit it. For instance, the ratios of the several constituents of the random esterified or interesterified products may be varied in order to similarly alter the characteristics of the final product, such as the melting point. The ratios of said product and the additives may be varied for the same purpose. Other glycols may be used in the above stated reactions such as the 1,3-propylene glycol as well as other glycols which are not toxic or harmful to human beings, such as the butylene glycols.

Compositions of the above type have a number of advantages in that they melt smoothly in the mouth, are palatable and do not exhibit the development of undesirable taste, flavor or odor on storage. These compositions are free from "bleeding." The addition to the primary propylene glycol esters, of glycerides of unsaturated acids imparts a desirable gloss to the products and does not adversely affect brittleness of the product of "snap," which is highly desirable in coatings and icings. In the various mixtures described above, the proportions may be altered in accordance with the results desired in various edible compositions.

We claim:

1. An edible composition comprising the random esterified mixture of palmitic and stearic acids with propylene glycol, having a closed capillary melting point of about 35–40° C., the proportions of said acids being about 65–85% palmitic and 35–15% stearic.

2. An edible composition having a closed capillary melting point of about 35° to 40° C. comprising the random esterified mixture of palmitic and stearic acids with propylene glycol, to which are added triglycerides of a mixture of acids taken from the class consisting of lauric, myristic, palmitic, oleic and stearic.

3. An edible composition comprising the random esterified mixture of oleic, palmitic and stearic acids with propylene glycol, having a closed capillary melting point of about 35–40° C., the proportions of said acids being about 50–70% palmitic, 30–10% stearic and 0%–20% oleic.

4. An edible composition having a closed capillary melting point of about 35–40° C. comprising the random esterified mixture of palmitic and stearic acids with propylene glycol to which are added esters of acids taken from the class consisting of palmitic and stearic acids esterified with an alcohol taken from the class consisting of mono, di and trihydric alcohols, said random esterified mixture comprising 80–95% of said composition and said added esters comprising 5–20% of said composition.

5. A composition according to claim 4 wherein said added esters are of glycerine.

6. A composition according to claim 5 in which said added esters are triglycerides.

7. A composition according to claim 4 wherein said added esters are of ethanol.

8. An edible composition according to claim 1 wherein the proportions of said acids are about 75% palmitic to 25% stearic.

References Cited in the file of this patent

UNITED STATES PATENTS

| | | |
|---|---|---|
| 1,542,513 | McKee | June 16, 1925 |
| 1,547,571 | Ellis | July 28, 1925 |
| 2,221,674 | Ellis | Nov. 12, 1940 |
| 2,430,596 | Ziels | Nov. 11, 1947 |

OTHER REFERENCES

Bhattacharya et al.: Jour. Chem. Soc. (1931), pp. 901–907.

Journal of American Pharmaceutical Association, vol. 26, Scientific Edition, June 1, 1937, pp. 475 to 479, entitled "A New Suppository Base," by John C. Bird.

Industrial Oil and Fat Products by Alton E. Bailey, 1945, Interscience Publishers Inc., New York, pp. 434 and 435.

Ralston: Fatty Acids and Their Derivatives, 1948, pp. 527–528.